(12) United States Patent
Szigeti et al.

(10) Patent No.: US 11,165,672 B2
(45) Date of Patent: Nov. 2, 2021

(54) APPLICATION PERFORMANCE MANAGEMENT INTEGRATION WITH NETWORK ASSURANCE

(71) Applicant: Cisco Technology, Inc., San Jose, CA (US)

(72) Inventors: Thomas Szigeti, Vancouver (CA); David John Zacks, Vancouver (CA); Mark Montanez, Gilroy, CA (US); Prakash Kaligotla, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 68 days.

(21) Appl. No.: 16/549,407

(22) Filed: Aug. 23, 2019

(65) Prior Publication Data

US 2021/0058306 A1 Feb. 25, 2021

(51) Int. Cl.
*G06F 15/173* (2006.01)
*H04L 12/26* (2006.01)
*H04L 12/24* (2006.01)

(52) U.S. Cl.
CPC .......... *H04L 43/04* (2013.01); *H04L 41/0609* (2013.01); *H04L 41/0631* (2013.01); *H04L 41/0686* (2013.01); *H04L 41/12* (2013.01)

(58) Field of Classification Search
CPC . H04L 43/04; H04L 41/0609; H04L 41/0631; H04L 41/0686; H04L 41/12
USPC ........................................................ 709/224
See application file for complete search history.

(56) References Cited

U.S. PATENT DOCUMENTS

| 7,366,790 B1 * | 4/2008 | Rustad ................ H04L 43/0858 370/229 |
| 8,699,359 B2 | 4/2014 | Eskicioglu et al. |
| 9,379,949 B2 | 6/2016 | Appachiappan et al. |
| 10,306,490 B2 | 5/2019 | Ratakonda et al. |
| 10,313,211 B1 * | 6/2019 | Rastogi .................... H04L 43/08 |
| 2010/0128623 A1 * | 5/2010 | Dunn ...................... H04L 41/12 370/252 |

(Continued)

OTHER PUBLICATIONS

Ahmed et al., "Studying the Effectiveness of Application Performance Management (APM) Tools for Detecting Performance Regressions for Web Applications: An Experience Report," 2016 IEEE/ACM 13th Working Conference on Mining Software Repositories (MSR), 2016, p. 1-12 (Year: 2016).*

(Continued)

*Primary Examiner* — Taylor A Elfervig
(74) *Attorney, Agent, or Firm* — Polsinelli PC

(57) ABSTRACT

Systems, methods, and computer-readable for determining performance metrics of a network include obtaining, from a network assurance system, one or more network performance metrics, the network performance metrics corresponding to execution of one or more applications in a network domain. An Application Performance Management (APM) system provides one or more applications performance metrics, the applications performance metrics corresponding to execution of the one or more applications in an applications domain. The one or more network performance metrics are integrated with the one or more applications performance metrics to determine integrated performance metrics for the one or more applications across the network domain and the applications domain.

16 Claims, 12 Drawing Sheets

(56) References Cited

U.S. PATENT DOCUMENTS

2016/0073278 A1* 3/2016 Roessler ............... H04L 45/64
  370/252
2016/0087861 A1* 3/2016 Kuan ................. H04L 43/065
  709/224
2017/0250880 A1* 8/2017 Akens ............... H04L 41/0631
2018/0365309 A1  12/2018 Oliner et al.

OTHER PUBLICATIONS

Heger et al., Application Performance Management: State of the Art and Challenges for the Future. In Proceedings of the 8th ACM/SPEC on International Conference on Performance Engineering (ICPE '17). Association for Computing Machinery, New York, NY, USA, 429-432. (Year: 2017).*

"A Roadmap for End-to-End Monitoring of Enterprise Applications in Hybrid Multi-Cloud," ONUG Monitoring and Analytics (M&A) Working Group, Mar. 20, 2018, pp. 1-19.

* cited by examiner

APPLICATION PERFORMANCE MANAGEMENT INTEGRATION WITH NETWORK ASSURANCE

TECHNICAL FIELD

The subject matter of this disclosure relates in general to the field of computer networking, and more particularly to integration of network and application performance metrics.

BACKGROUND

Enterprise networks and application data centers are typically managed by independent teams, with very little information sharing between the two teams. Thus, if a user experiences an application performance issue, there are currently no known approaches for determining in a straightforward and timely manner whether the issue is due to an application or due to an underlying network malfunction, for example. Application performance issues are particularly challenging because systems and controls in the enterprise network do not have direct access or visibility into the application platform of the application data centers. Thus, in conventional setups, efficient triaging of issues to determine whether the issues are in an applications domain or a network domain is a challenge. Correspondingly, a root-cause analysis and remediation to rectify the issues are also difficult.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
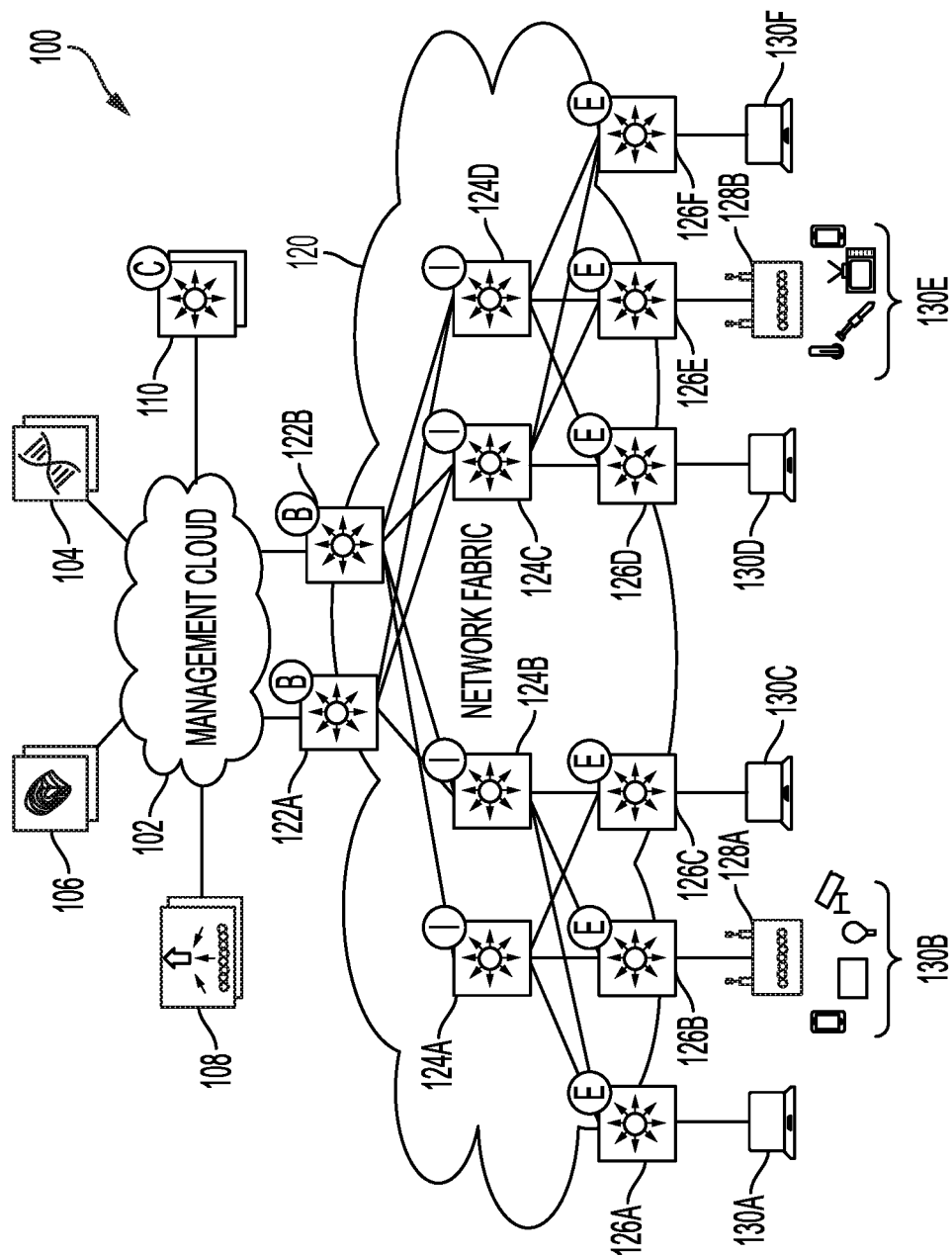
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for integrating Application Performance Management (APM) systems with Network assurance systems to enable efficient triage, root-cause analysis, and remediation of issues which may arise in either an applications domain managed by the APM systems or a network domain managed by the network assurance systems. Network assurance systems can monitor the performance of applications across networks, such as enterprise networks. The APM systems can utilize network technologies such as Application Visibility and Control (AVC), which includes Network Based Application Recognition (NBAR2) to identify applications, as well as use tools such as Application Response Time Monitor (ART), which can report on the performance of an application, in terms such as latency, loss and application-server delay, referred to as Key Performance Indicators (KPIs). The KPIs can be tracked by tools like ART on individual application flows and can be exported, e.g., via telemetry to the network assurance systems by means of protocols such as Flexible NetFlow (FNF). In turn the network assurance systems can provide views of these KPIs, like latency, loss, and application-server delay.

In some examples, the application performance KPIs can be transformed into representations of composite and abstracted application health scores. As such, an application health score can reflect good/fair/poor values of latency, jitter, loss or other metrics that contribute to an application's overall performance. Similarly, the APM systems can obtain KPIs to reflect how an application is performing within a data center during runtime environments and convert these KPIs to score-based metrics, referred to as APM scores. The APM scores can be integrated with network scores obtained from the network assurance system, to generate combined APM and network scores, also referred to as application health scores. Accordingly, application performance information can be shared between the network and the applications teams, at a macro-level.

In example aspects, the integration of scores and other information sharing between the APM system and the network assurance system can provide information regarding performance of applications in both the enterprise network and in the data center domains, while also providing clarity on whether an application issue is caused by the enterprise network and/or within the data center. This way, critical triage decisions for issue handling can be expedited.

In some examples, known application performance issues are shared between both domains. For example, the network assurance system may be aware of applications that have slow network latency and can flag or report these known issues to be visible to the APM system. Similarly, the APM system can share or report issues with servers that may cause applications issues (e.g., servers running out of resources such as CPU, memory, disk-space, software-execution hangs, bugs, etc.). The sharing of known issues also helps with narrowing down run-time triaging and causation analysis.

In some examples, path analysis views or traces can also be integrated between the networks domain and the applications domain. For example, within the enterprise, the network assurance system can provide a path trace of a client device across the enterprise network (e.g., including Layer 2 (wired and wireless LAN connections), Layer 3 (IP routing paths), logical overlays (e.g., CAPWAP, VXLAN, GRE, etc.), and the like. Additionally the health of each network device in the path trace can be provided. Similarly, interface statistics for the network's edge nodes, ports, etc., can also be provided. The APM system can also provide a detailed view of transaction tiers and paths within the data center runtime environment. The paths obtained from the network assurance system and the APM systems can be integrated to generate complementary views of a trace from the client device detailed all the way through to the application server in the runtime environment, for example.

In some examples, a method is provided. The method includes obtaining, from a network assurance system, one or more network performance metrics, the network performance metrics corresponding to execution of one or more applications in a network domain. The method further includes obtaining, from an Application Performance Management (APM) system, one or more applications performance metrics, the applications performance metrics corresponding to execution of the one or more applications in an applications domain. The method further includes integrating the one or more network performance metrics with the one or more applications performance metrics to determine integrated performance metrics for the one or more applications across the network domain and the applications domain.

In some examples, a system is provided. The system, comprises one or more processors; and a non-transitory computer-readable storage medium containing instructions which, when executed on the one or more processors, cause the one or more processors to perform operations including: obtaining, from a network assurance system, one or more network performance metrics, the network performance metrics corresponding to execution of one or more applications in a network domain; obtaining, from an Application Performance Management (APM) system, one or more applications performance metrics, the applications performance metrics corresponding to execution of the one or more applications in an applications domain; and integrating the one or more network performance metrics with the one or more applications performance metrics to determine integrated performance metrics for the one or more applications across the network domain and the applications domain.

In some examples, a non-transitory machine-readable storage medium is provided, including instructions configured to cause a data processing apparatus to perform operations including: obtaining, from a network assurance system, one or more network performance metrics, the network performance metrics corresponding to execution of one or more applications in a network domain; obtaining, from an Application Performance Management (APM) system, one or more applications performance metrics, the applications performance metrics corresponding to execution of the one or more applications in an applications domain; and integrating the one or more network performance metrics with the one or more applications performance metrics to determine integrated performance metrics for the one or more applications across the network domain and the applications domain.

In some examples, the one or more network performance metrics comprise one or more of a latency, jitter, network delay, response time, application delay, packet loss or retransmissions of one or more packets of the one or more applications flowing through an enterprise network in the network domain. In some examples, the one or more network performance metrics are measured by an Application Response Time (ART) tool for inspecting packets flowing between a client and a server in the network domain.

In some examples, the one or more applications performance metrics comprise one or more of a latency, application delay, load, average response time, error rate, processor utilization, or memory utilization, for execution of the one or more applications in the applications domain.

In some examples, performing a triaging of an applications issue is based on the integrated performance metrics to determine whether the application issue was caused in one of the network domain, the applications domain, or both the network domain and the applications domain. In some examples, determining a root cause of the applications issue is based on the triaging.

Some examples further comprise sharing known applications issues in the applications domain with the network domain, or sharing known applications issues in the network domain with the applications domain.

In some examples, the one or more network performance metrics comprise a network health score, the one or more applications performance metrics comprise an APM health score, and the integrated performance metrics comprise an integrated applications health score.

Some examples further comprise integrating a network trace of network elements in the network domain with an application trace of application elements in the applications domain, to determine an end-to-end integrated trace of elements in the path of an application executing across the network domain and the applications domain.

Description of Example Embodiments

Disclosed herein are systems, methods, and computer-readable media for schemes according to which, analytics related to network infrastructure can be integrated with applications domain data. For example, a network data platform (NDP) can be provided in a network assurance system of an enterprise network, where the NDP can obtain one or more key performance indicators (KPIs) from an Application Performance Management (APM) system, where the one or more KPIs pertain to applications executing in an applications domain or data center, for example. The NDP can also obtain network performance metrics from for the applications executing in an enterprise network, and integrate the one or more KPIs with the one or more network performance metrics to determine end-to-end performance information for the applications across the enterprise network and the applications domain.

Correspondingly, the example schemes disclosed herein can overcome the aforementioned problems associated with conventional approaches where networks and application data centers are typically managed by independent teams, with very little information sharing between the two teams. For example, the disclosed schemes provide platforms for efficient triaging whether an application issue is at the applications domain, determining a root cause upon the triaging, performing a corrective measure based on determining the root cause, among others.

In example aspects, integrating the network domain and the applications domain can include integrating APM scores representing the applications/KPIs and network performance scores representing the one or more network performance metrics can provide combined health scores for the one or more applications. The disclosed techniques can also enable sharing known performance issues between the applications domain with the enterprise network, as well as integrating application traces in the applications domain and network traces in the enterprise network to provide end-to-end visibility. The following sections describe the example systems and methods in more detail.

FIG. 1 illustrates an example of a physical topology of an enterprise network 100 which may be configured according to aspects of this disclosure. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
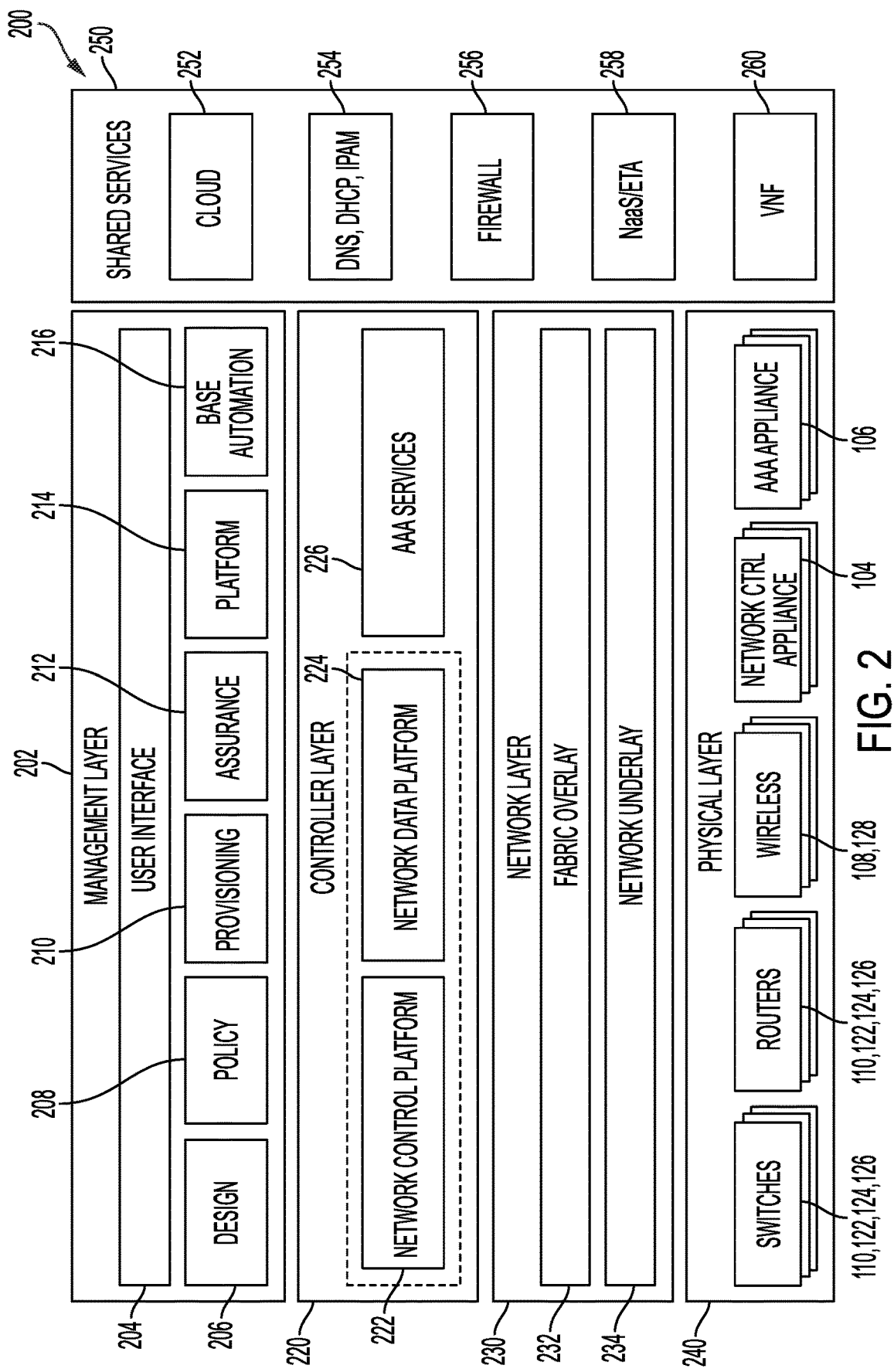
FIG. 2 illustrates a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

Figure 3:
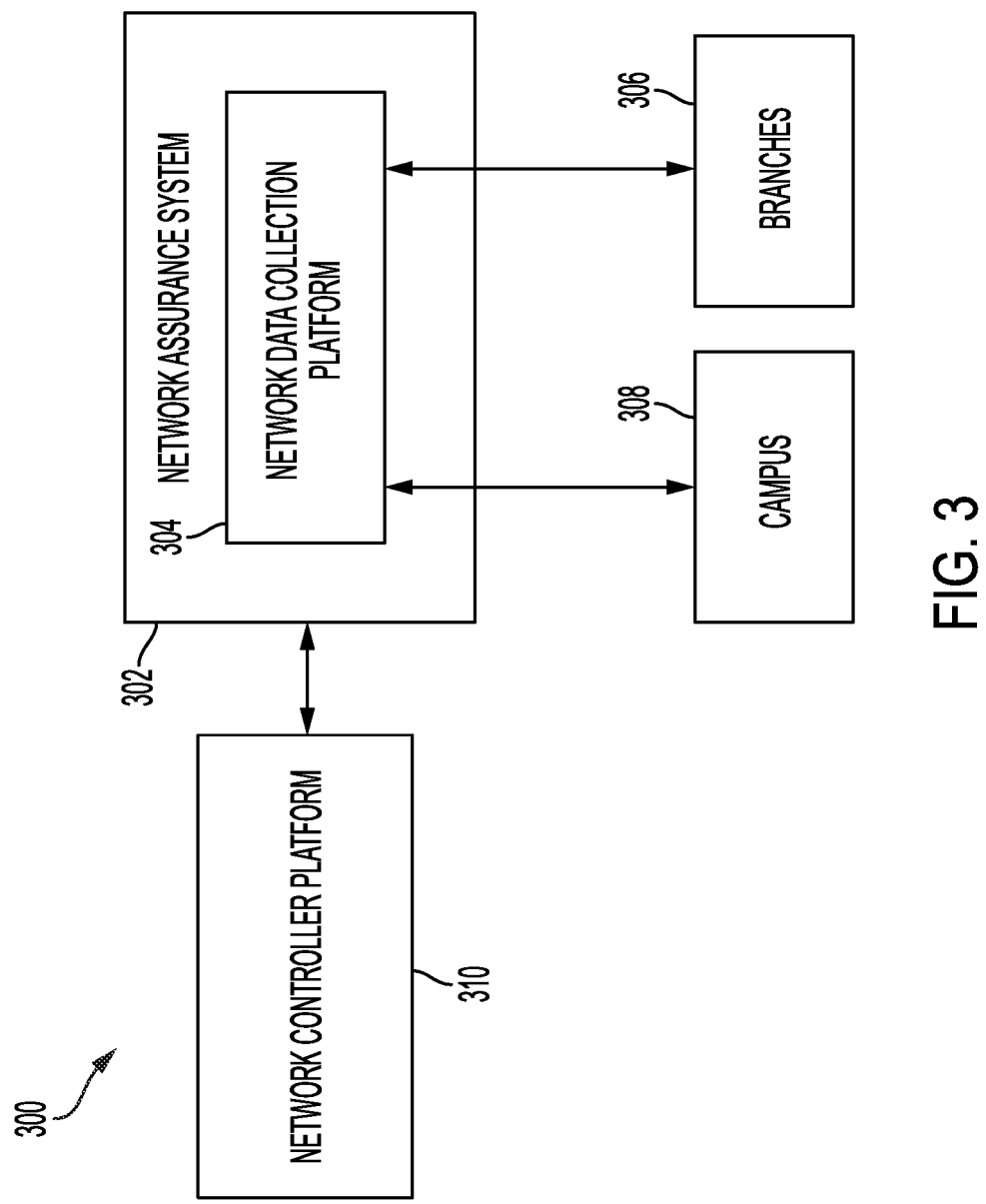
FIG. 3 illustrates a aspects of a network domain for determining network performance metrics, in accordance with some examples.

FIG. 3 is a block diagram which illustrates aspects of a network 300 according to this disclosure. The network 300 can also include an enterprise network such as the enterprise network 100 shown and described with reference to FIG. 1. The network 300 can include a network assurance system 302, which can be configured to perform functions similar to the assurance functions 212 described with reference to the logical architecture 200 for the enterprise network shown in FIG. 2. For example, the network assurance system 302 can use machine learning and/or other data analytics tools to provide end-to-end visibility of the network 300 by learning from the network infrastructure, endpoints, and other contextual sources of information from an APM system according to this disclosure. The network 300 can support both wireless and wired networks In various aspects, the network 300 can be configured for operations of an entity (e.g., a company, school, etc.) that includes any number of local networks. For example, the network 300 can include local networks of any number of branches 306 (e.g., branch offices) and/or a campus 308 that may be associated with the entity. Data collection from the various local networks/locations such as the campus 308 and/or the branches 306 may be performed by a network data collection platform (NDP) 304 that communicates with a network controller platform (NCP) 310.

Figure 7:
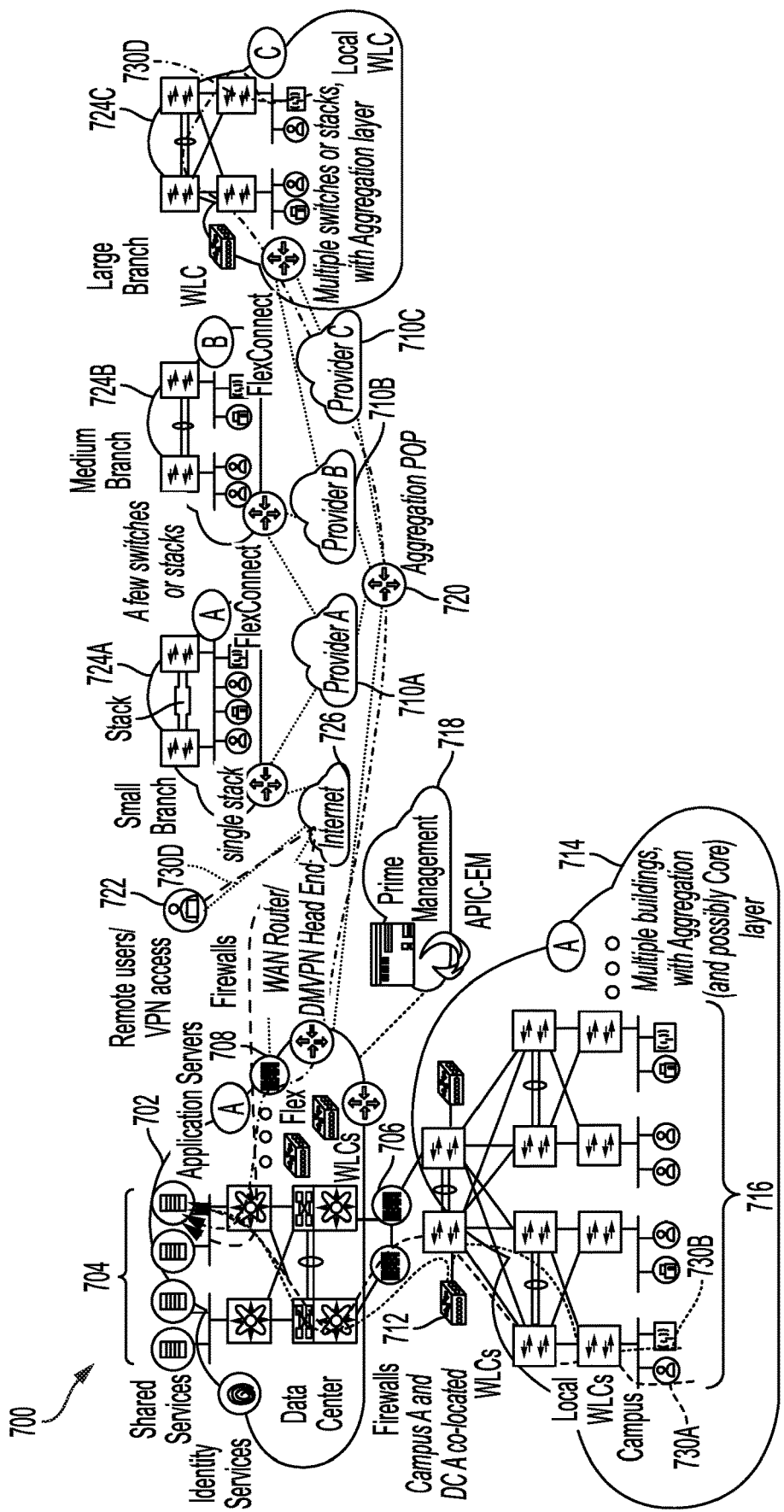
FIG. 7 illustrates an enterprise network configured for an integrated traces between a network domain and one or more applications domains, in accordance with some examples.

Example details of the branches 306 and the campus 308 are shown in FIG. 7. In general, the network of branches 306 can include one or more wireless access points through which endpoint nodes may connect. The access points may, in turn, be in communication with any number of wireless LAN controllers (WLCs) which may be located in one or more datacenters. For example, the access points may communicate with the WLCs via a virtual private network (VPN) and the NDP 304 may, in turn, communicate with the devices in datacenter of the branches 306 to retrieve the corresponding network feature data from the access points, WLCs, etc.

In some examples, the local network of the campus 308 may use one or more access points that provide connectivity to endpoint nodes, e.g., in a decentralized manner. For example, the access points of the campus 308 can be connected to distributed WLCs and switches/routers.

The NCP 310 can support the operations of the network, including network services and control plane functions. For example, the NCP 310 can support functions such as routing topology and network metric collection functions such as routing protocol exchanges, path computations, monitoring services, authentication functions, mobility functions, management functions, and/or automation and control functions such as by an APIC-Enterprise Manager (APIC-EM).

The NDP 304 may receive a variety of data feeds that convey collected data from the devices of the branches 306 and the campus 308, as well as from network services and network control plane functions such as from the NCP 310. Example data feeds may include management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, the NDP 304 may receive the collected data on a push and/or pull basis, as desired. The NDP 304 can prepare and store the collected data for processing by a cloud service (e.g., the management cloud 102 of FIG. 1) in some cases.

In some examples, the network assurance system 302 can also be configured to determine and provide statistics regarding health or performance of the network 300 based on the data collected by the NDP 304 from the one or more networks such as the campus 308, branches 306, etc. For example, the network health or network performance can be measured in terms of metrics such as the throughput, bandwidth utilization, packet loss, latency, application delays, etc. In some example implementations of the network assurance system 302 (e.g., configured according to the Cisco DNA Assurance system), performance of applications across the networks such as campus 308, branches 306, etc. can be monitored using network technologies such as Application Visibility and Control (AVC). The AVC includes a Network Based Application Recognition (NBAR2) to identify applications, as well as tools like Application Response Time Monitor (ART), which can report the performance of an application, in terms such as latency, loss and application-server delay. The performance of applications in the network can be determined based on the above metrics, as will be discussed with reference to FIGS. 4-5.

Figure 4:
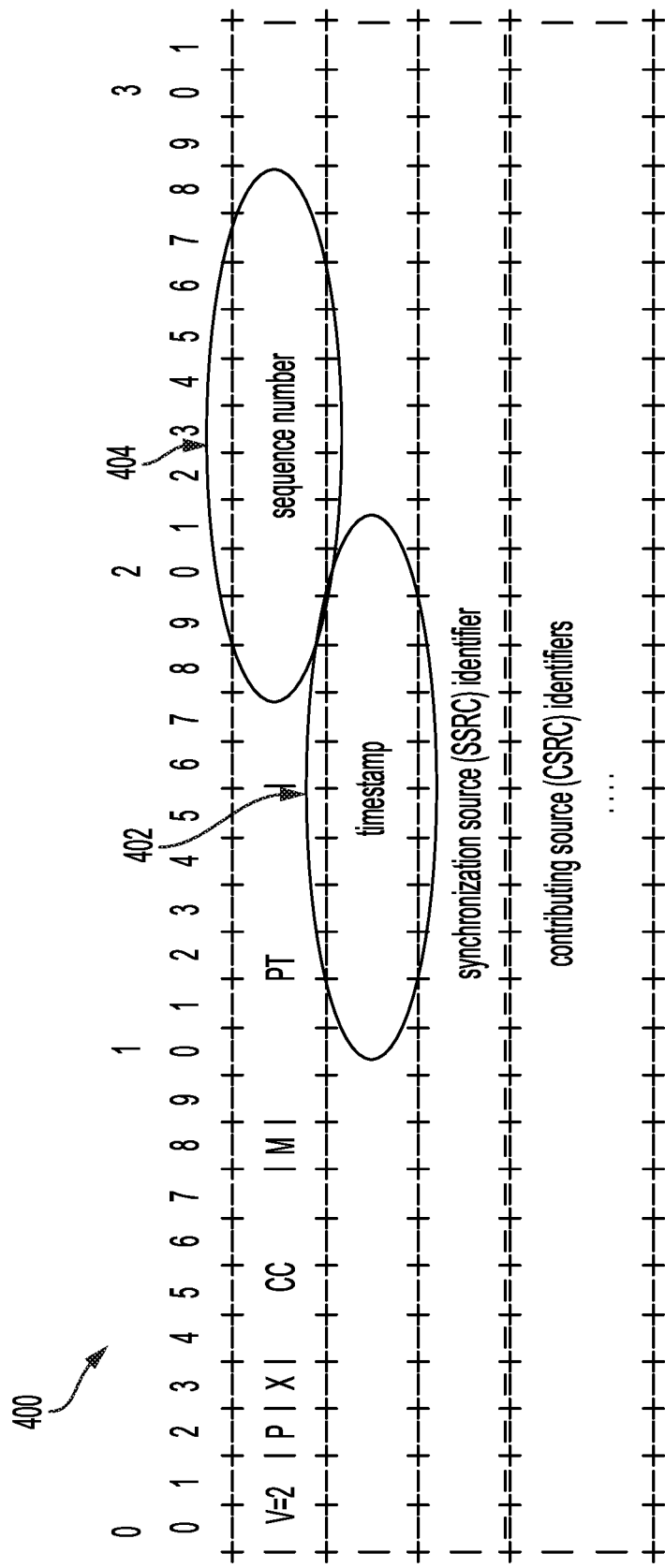
FIG. 4 illustrates a packet format for determining network performance metrics, in accordance with some examples.

FIG. 4 illustrates an example of a Real-time Transport Protocol (RTP) packet 400 which may be a packet format used for data transmission in one or more networks such as the campus 308, branches 306, etc. The NDP 304 can obtain the following information by studying packets such as the RTP packet 400. A timestamp 402 indicates timestamps at which the packet 400 was transmitted (or observed at certain nodes). A sequence number 404 indicates the sequence number of the RTP packet 400. The RTP packet 400 can pertain to an application on one of the networks being monitored. According to some examples, a metric such as jitter can be calculated by comparing the timestamp 402 of the RTP packet 400 with a timestamp of a subsequent RTP packet. A metric such as packet loss can be identified by determining whether sequential packets have sequential sequence numbers. For example if the sequence number 404 of the packet 400 indicates that a packet immediately prior or subsequent to the packet 400 was not received, then an indication of a packet loss for the immediately prior or subsequent can be obtained, respectively.

Figure 5:
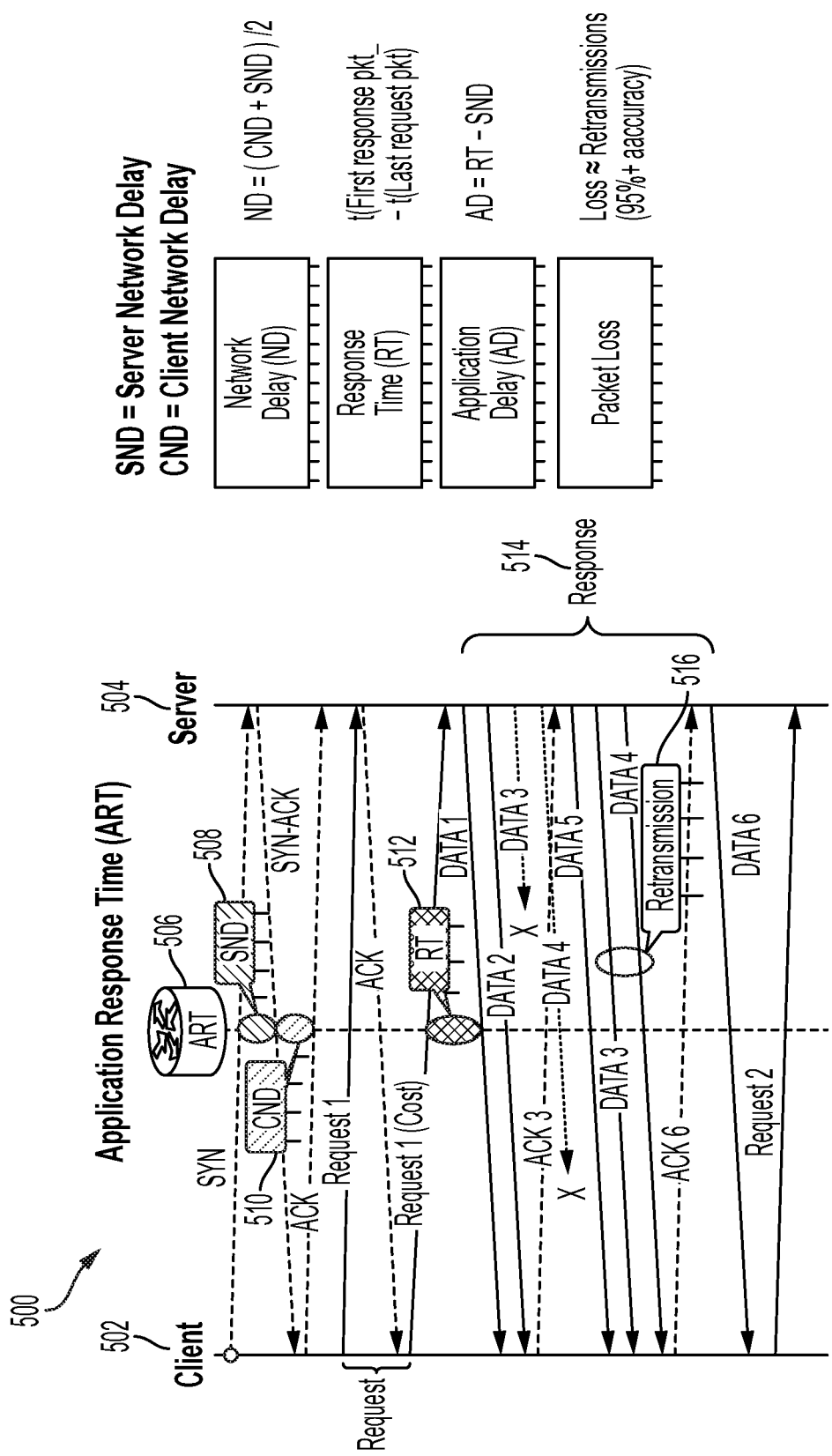
FIG. 5 illustrates a traffic flow for determining network performance metrics, in accordance with some examples.

FIG. 5 illustrates an example of a Transmission Control Protocol (TCP) flow 500 which may be used for determining application performance information such as latency, and loss for TCP applications. In FIG. 5, a client 502 and a server 504 are shown, which may include two of the end points 130 of FIG. 1 in some examples. The client 502 and the server 504 may exchange TCP packets pertaining to a TCP application whose performance is being monitored using an Application Response Time Monitor (ART) 506. The ART 506 can capture information about control/data packets exchanged between the client 502 and the server 504 as follows.

For a packet which does not require significant processing by a recipient (e.g., SYN) originated by the client 502, the ART 506 can capture a first time at which the packet was detected by the ART 506 en route to the server 504 and a second time at which a response (e.g., SYN-ACK) from the server 504 was detected en route to the client 502. A difference between the second time and the first time provides a server network delay (SND) 508, as there is no significant processing time involved at the server 504 in this measurement. Similarly, for a response from the client 502 which does not require significant processing at the client 502 (e.g., an ACK to the SYN-ACK) can be detected by the ART 506 en route to the server 504 at a third time and a difference between the third time and the second time provides a client network delay (CND) 510. A network delay (ND) for the TCP application can be calculated as the average of the SND 508 and the CND 510 (e.g., ND=(CND+SND)/2), which provides one of the example metrics for determining the performance of the application in the network.

For a request which requires processing at the recipient (e.g., Request 1) originating from the client 502, the ART 506 can capture a fourth time at which the request was detected by the ART 506 en route to the server 504 and a fifth time at which a response (e.g., a first of one or more data packets generated after processing Request 1) from the server 504 was detected en route to the client 502. A difference between the fifth time and the fourth time provides a round trip time (RT) 512. Subtracting the SND 508 from the RT 512 provides an application delay or the processing delay at the server 504. The application delay provides another example metric for determining the performance of the application in the network.

When more than one data packet is sent from the server 504, subtracting from a sixth time at which a last data packet was detected by the ART 506, the fifth time at which the first data packet was received provides a response time (RT) 514 for the server 504. The response time provides yet another example metric for determining the performance of the application in the network.

In the example TCP flow 500 of FIG. 5, a retransmission 516 is detected (e.g., based on monitoring the order of data packets indicated by their sequence numbers, similar to the sequence number 404 of the packet 400 of FIG. 4). The retransmission provides an indication of packet loss, e.g., the retransmission may have occurred because a packet initially transmitted may have been lost. The number of retransmissions for packets of an application in the network can also provide an example metric for determining the performance of the application in the network.

Accordingly, the one or more performance metrics for applications on the network 300 can be tracked using tools like the ART 506. These performance metrics are also referred to as key performance indicators (KPIs) of applications in the network 300. The KPIs can include the application performance measured in terms one or more of latency, packet loss, application delays, server delays, retransmissions, etc. In some examples, the KPIs of the network 300 tracked by tools such as the ART 506 on individual application flows can be exported via telemetry to network analytics engines, like the network assurance system 302 or a Cisco DNA Center, using, for example, protocols such as a Flexible NetFlow (FNF). Correspondingly, the network assurance system 302 can provide views of these KPIs, like latency, loss, application-server delay, etc., to various visualization tools or interfaces.

In some examples, the data represented by the KPIs can be transformed into representations of composite and/or abstracted application health scores. For example, application health scores can reflect good/fair/poor values of latency, jitter, loss or other metrics that contribute to an application's overall performance in the network 300.

In some examples, Application Performance Monitoring (APM) systems (e.g., Cisco AppDynamics) can provide internal KPIs of a monitored network in an applications domain (e.g., within the campus 308 and/or branches 306), where these internal KPIs can reflect how an application is performing within the data center and runtime environments. In some examples, the APM systems can also generate score-based metrics from the internal KPIs (e.g., AppDynamics Transaction Scorecards).

Accordingly, the network assurance system 302 can determine performance of applications in the network in terms of KPIs which reflect the health or performance of the network and these can be integrated with the internal KPIs in example aspects. In this manner, an end-to-end visibility can be provided for an application. Any issues or performance concerns detected can then be efficiently triaged to determine whether there is a network issue or whether execution of the application in the applications domain (e.g., within the campus 308 and/or branches 306) may have given rise to these issues. For example, visibility into the performance of the applications within the networks such as the campus 308, branches 306, etc., can be provided to the network assurance system 302 using the example techniques discussed herein.

Figure 6:
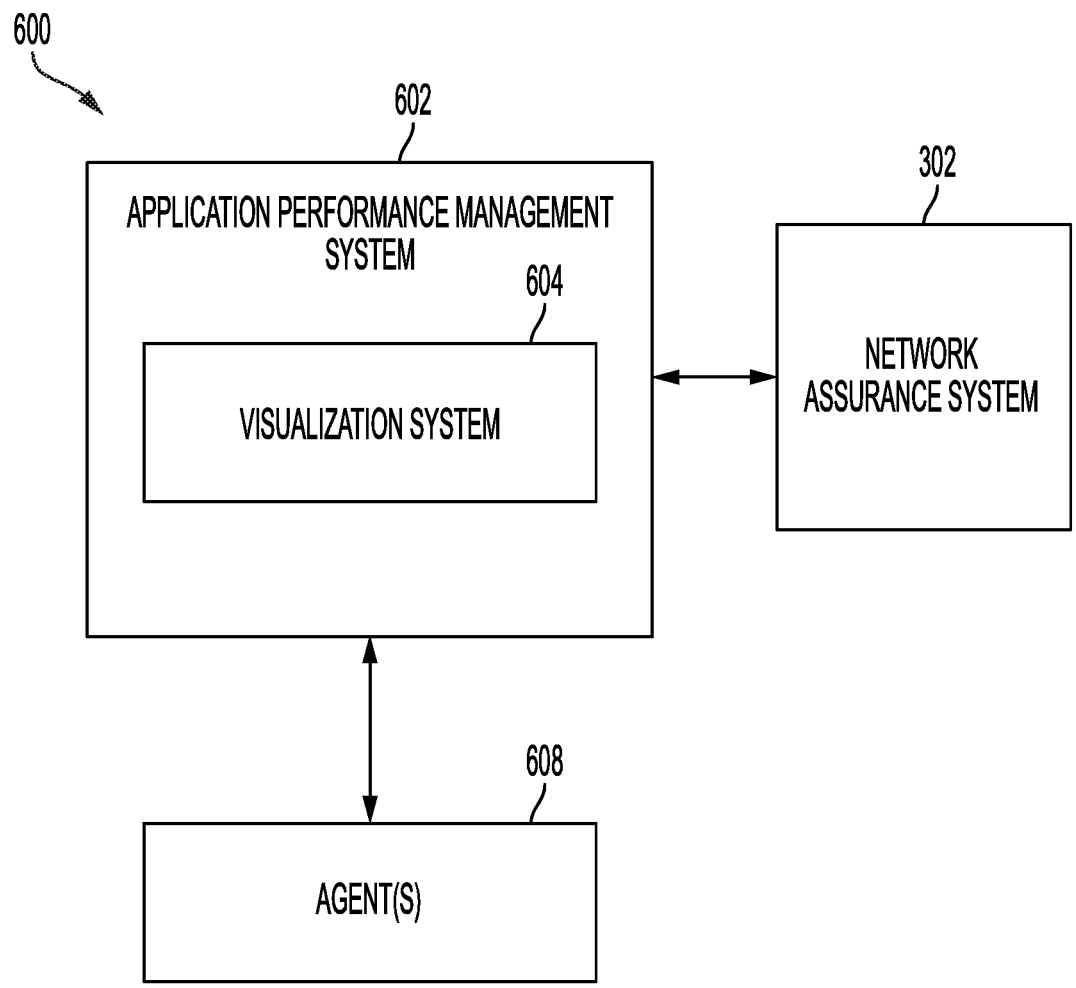
FIG. 6 illustrates a aspects of a applications domain for determining applications performance metrics, in accordance with some examples.

FIG. 6 is a block diagram of an example application intelligence platform 600 that can monitor and collect metrics of performance data for an application environment being monitored. The application intelligence platform 600 can include an Application Performance Management (APM) system 602 which can collect information from one or more agents 608. The total number of agents and number of controllers such as the APM system 602 can vary based on a number of factors including the number of applications monitored, how distributed the application environment is, the level of monitoring desired, the level of user experience desired, and so on.

The APM system 602 can provide a central processing and administration server for the application intelligence platform 600. In some examples, The APM system 602 can include a visualization system 604 such as a user interface (UI) for monitoring, analyzing, and troubleshooting the monitored environment. The APM system 602 can control and manage monitoring of transactions (e.g., business transactions) distributed over application servers. For example, the APM system 602 can receive runtime data from the agents 608 (and/or other coordinator devices), associate portions of transaction data, communicate with the agents 608 to configure collection of runtime data, and provide performance data and reporting through the visualization system 604. In some examples, the APM system 602 can also provide the performance data and reporting to the network assurance system 302 of FIG. 3, according to disclosed techniques. In some examples, an interface between the APM system 602 and the network assurance system 302 can include a web-based or other type of graphical interface viewable by a client device. In some implementations, the visualization system 604 can be implemented in a separate machine (e.g., a server) different from the one hosting the APM system 602 and the visualization system 604 can be directly accessed or interfaced with the network assurance system 302.

The agents 608 can deployed to monitor applications, databases and database servers, servers, data centers, and end user clients for the monitored environment. One or more of the agents 608 can be implemented as different types of agents with specific monitoring duties. For example, application agents may be installed on each server that hosts applications to be monitored. Instrumenting an agent adds an application agent into the runtime process of the application.

One or more of the agents 608 can include database agents, for example, may be software (e.g., a Java program) installed on a machine that has network access to the monitored databases and the controller. Database agents can query the monitored databases in order to collect metrics (e.g., KPIs, health scores, traces, etc.) and pass those metrics along for collection and further analysis by the APM system 602. One or more database agents can be deployed in the different network of the monitored environment, such as the campus 308, branches 306, etc.

One or more of the agents 608 can also include machine agents or programs (e.g., Java programs) that collect hardware-related performance statistics or metrics from the servers (or other suitable devices) in the monitored environment, such as the campus 308, branches 306, etc. The machine agents can be deployed on machines that host application servers, database servers, messaging servers, web servers, etc.

One or more of the agents 608 can also include end user monitoring (EUM), where EUM may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

According to example aspects, the APM system 602 of the application intelligence monitoring platform 600 can provide application intelligence or application health/performance data by monitoring an application environment using the one or more agents 608 as discussed above. The application The applications can include various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers. A transaction representation of the particular service provided by the monitored environment provides a view on performance data in the context of the various tiers that participate in processing a particular request. For example, a business transaction, which may be identified by a unique business transaction identification (ID), can represent an end-to-end processing path used to fulfill a service request in the monitored environment (e.g., adding items to a shopping cart, storing information in a database, purchasing an item online, etc.). The processing path for the business transaction can be represented using a trace or a path by the APM system 602. For example, a trace of the business transaction can include a path which represents a user-initiated action in the monitored environment, defined by an entry point and a processing path across application servers, databases, and potentially many other infrastructure components. Each instance of a business transaction can include an execution of that transaction in response to a particular user request (e.g., a socket call, illustratively associated with the TCP layer). In an example, the trace can include a representation of an incoming request at an entry point and a tracking of the activity associated with the request at the originating tier and across distributed components in the application environment (e.g., associating the business transaction with a 4-tuple of a source IP address, source port, destination IP address, and destination port). The trace or a flow map can be generated for the transaction that shows the touch points for the transaction in the application environment (e.g., as shown and discussed further with reference to FIG. 8 below).

In addition to the traces, the APM system 602 can also generate health rules can be set up with conditions that use the dynamically generated baselines to trigger alerts or initiate other types of remedial actions when performance problems are occurring or may be about to occur. For example, dynamic baselines can be used to automatically establish what is considered normal behavior for a particular application. Policies and health rules can be used against baselines or other health indicators for a particular application which can enable faster detection and troubleshooting of problems. Health rules can be used to define metric conditions to monitor. Examples of health rules for testing a performance of an application such as a business transaction can include response time and error rate for the transaction. Some other example metrics related to the performance of the application can include a load, average response time, error rate, processor utilization, memory utilization, etc.

In example aspects, the APM system 602 can share information with the network assurance system 302. For example, the APM system 602 can report information regarding an application's KPIs, health, traces, policies, etc. In some examples, the application health information can also include an application score, which can be integrated with the aforementioned application health scores obtained by the network assurance system 302 from tools such as the ART 506.

Accordingly in some examples, application health scores obtained from the APM system 602 (or "the APM scores") can be integrated with application health scores of the network (or "the network scores") obtained from tools such as the ART 506 of the network assurance system 302. The integration of the APM scores and the network scores can provide overall or "integrated application health scores". Accordingly, application performance information between the network teams and the applications teams, at a macro-level.

As a result of the integration, the overall or integrated application health scores, reflect highly accurate application performance in both the enterprise network and in the data center domains. In some examples, an integrated application health score can be provided using a user interface for an application with options for a user to obtain further information from the integrated application health score. For example, a user can be presented with options to obtain a network score and an APM score for the application, for example, from selectable options provided with the integrated application health score. In some examples, scorecards, KPIs, etc., which contribute to the network score, APM score, integrated application health score, etc., can be obtained. These individual scores can enable efficient triaging of any issues. For example, if investigating the integrated application health score reveals that the integrated application health score is low because an associated APM score is low, then the condition can be investigated further by delving into the APM score (without necessarily focusing on a possibly healthy network score).

From the above-described sharing of policies, known issues, etc., the low APM score can be investigated further to determine whether it is caused by a known issue. As previously mentioned, sharing known or pre-existing application performance issues between both domains can improve critical triaging of issues. For example, if the network assurance system 302 is aware of applications that have slow network latencies, these are flagged to the APM system 602 in some examples. Similarly, the APM system 602 can report known issues (e.g., servers that may be running out of processing resources, memory resources, etc., software bugs, hangs, or the like) to the network assurance system 302.

For unreported or new problems, traces can be obtained to identify potential issues at a server resource, or network within a data center (e.g., a campus 308 or branches 306). Specific code problems can also be identified in this manner. In some examples, if slow transactions or errors are revealed from a low APM score, then details regarding these can be obtained from the path or flow generated by the APM system 602. In some examples, the integration of the APM scores and the network scores can be performed by the network assurance system 302. In some cases, the APM system 602 and the network assurance system 302 can interface at a load balancer.

In some examples, path analysis views or application traces can be integrated between the network domain and the applications domain (e.g., a network trace such as a Cisco DNA Center Path Trace for the network domain can be integrated with an application trace such as an AppDynamics path trace for the applications domain). The network trace in the network domain can provide a path trace of a client device across the enterprise network, complete with Layer 2 (wired and wireless LAN connections), Layer 3 (IP routing paths), as well as any logical overlays (like CAP-WAP, VXLAN, GRE, etc.). For example, a network trace can be performed by tools such as the network assurance system 302 to generate a transaction flow from a client to an edge of a data center, where a load balancer may be deployed. The APM system 602 can generate a flow of the internal view of the data center starting from the load-balancer. Thus, complementary views of the application flow can be merged to obtain an end-to-end flow-view.

FIG. 7 illustrates a schematic view of a network 700 with examples of end-to-end flow-views according to this disclosure. The network 700 can include an enterprise network similar to the enterprise network 100 of FIG. 1. Although the components, functions, interconnections, and operations of the network 700 will not be repeated in detail, similar components of the network 700 can include similar functionality as that described with respect to the enterprise network 100 of FIG. 1 and the discussion of various other aspects herein. Accordingly, the network 700 can include a campus 714 (e.g., similar to the campus 308) co-located with a data center 702, as one or more branches 724A-C (e.g., similar to the branches 306).

The campus 714 can include one or more endpoints 716 connected through a network fabric comprising one or more layers of switches, routers, etc., to one or more fabric border nodes, including, for example, one or more WLCs 712. One or more firewalls 706 can be provided for security of traffic entering or exiting the campus 714.

The data center 702 can include a network fabric with one or more border nodes (e.g., WLCs), intermediary switches, routers, etc., leading to one or more application servers 704 which can provide shared resources among the campus 714, the one or more branches 724A-C, remote users/VPN access 722, etc. The data center 702 and the campus 714 can be co-located as noted above in some examples, and can include wired as well as wireless interfaces between them.

The branches 724A-C can be of various sizes (e.g., small, medium, large, as illustrated) and can be supported by respective providers 710A-C. The branches 724A-C can communicate wirelessly with the data center 702 and other network elements, e.g., through an aggregation POP 720. The data center 702 can implement firewalls such as the firewall 708 to provide security functions related access from the branches 724A-C or through the internet 726, e.g., for access by the remote user 722.

According to various examples, the integration of integration of network traces with application traces can provide end-to-end visibility as shown by the illustrative paths 730A-D. The path 730A illustrates an example of an application flow from the campus 714 to the servers 704 of the data center 702 through a wired path. The path 730B illustrates an example of an application flow from the campus 714 to the servers 704 of the data center 702 through a wireless path enabled by the WLCs 708. The path 730A illustrates an example of an application flow from an end user of the branch 724C to the servers 704 of the data center 702 through a combination of wired and wireless paths. The path 730D illustrates an example of an application flow from the remote user 722 to the servers 704 of the data center 702 through the internet 726. The paths 730A-D show that a trace can be obtained for the application flow within an application domain (e.g., within the data center 702), integrated with the network trace, e.g., through the campus 714, branches 724A-C, etc.

Figure 8:
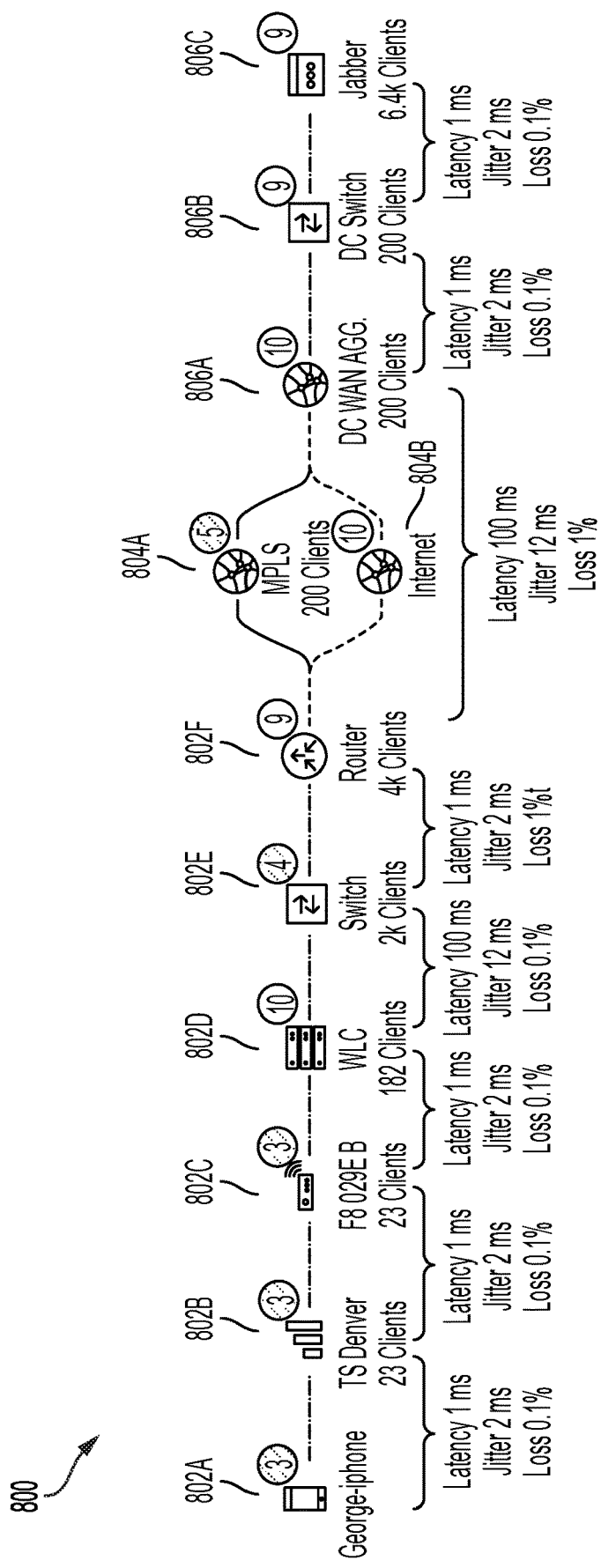
FIG. 8 illustrates an integrated end-to-end trace between a network domain and an applications domains, in accordance with some examples.

FIG. 8 illustrates a trace 800 which can be obtained using example aspects of this disclosure. In some examples, the trace 800 can include information regarding the health, network statistics, performance metrics, etc., of various network devices in the trace 800. The trace 800 can include a path which connects the network elements 802A-F within a network, with performance indications, network metrics, etc., provided at each of these elements. The trace 800 can also include interfaces such as 804A-B through which the network elements 802A-F to data center elements 806A-C. Accordingly, end-to-end visibility can be obtained from the trace 800.

Figure 9:
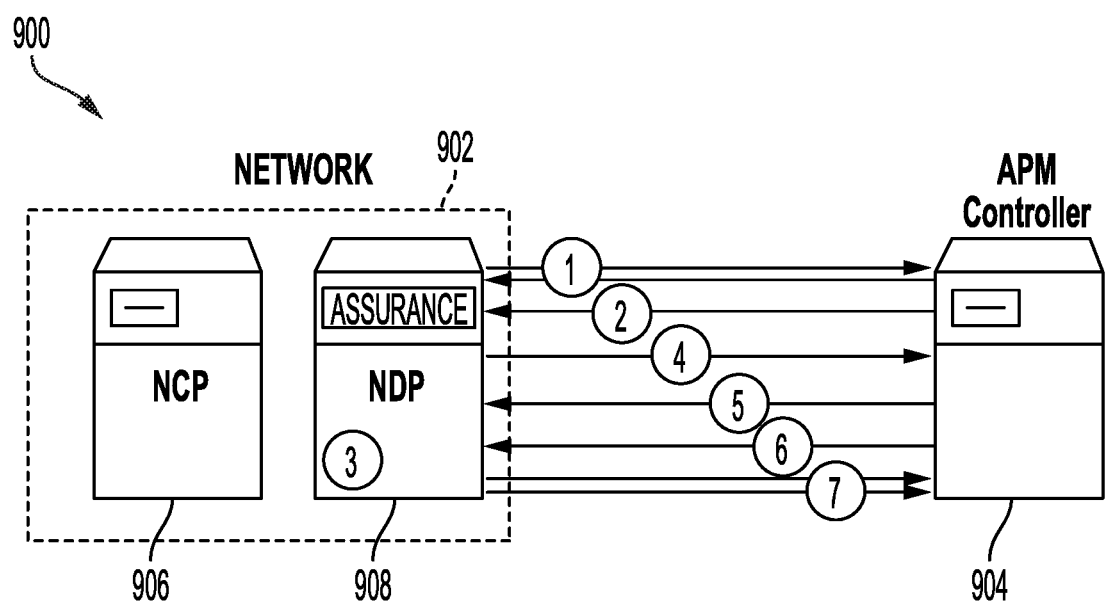
FIG. 9 illustrates information exchanges for integrating a network domain and an applications domains, in accordance with some examples.

FIG. 9 illustrates a schematic view of example information exchanges 900 between a network domain and an application domain according to aspects of this disclosure. A network 902 is shown, which can be similar to the enterprise networks 100, 700, etc., discussed above. The network 902 can include an NCP 906 similar to the NCP 310 of FIG. 3 and network assurance system 908 similar to the network assurance system 302 of FIG. 3. The network assurance system 908 can include an NDP among other functional blocks. The network 902, or in some specific examples, the network assurance system 908 can interface with an APM controller 904, which may be similar to the APM system 602 of FIG. 6.

In a first step identified as step "1", a secure bi-directional connection can be established between the network assurance system 908 and the APM controller 904, e.g., using Role-Based Access Control (RBAC) protocols.

In a second step or step "2", the APM controller 904 can share a list of applications that are currently being monitored by the APM controller 904, e.g., using a e.g. a Fully-Qualified Domain Names (FQDN) format.

In a third step or step "3", the NDP of the network assurance system 908 can correlate the shared list of applications from the APM controller 904 with applications in the network 902, e.g., by comparing the FQDNs with applications in a DNAC Application Registry of the network 902.

In a fourth step or step "4" and a fifth step or step "5", the network assurance system 908 and the APM controller 904 can share or integrate respective health scores, a network health score, and an APM health score, e.g., using model-based streaming telemetry.

In a sixth step or step "6", the APM controller 904 can stream any known application issues/alerts raised to the network assurance system 908.

In a seventh step or step "7", path flow or trace information can be shared bi-directionally, e.g., on an on-demand basis between the APM controller 904 and the network assurance system 908.

Figure 10:
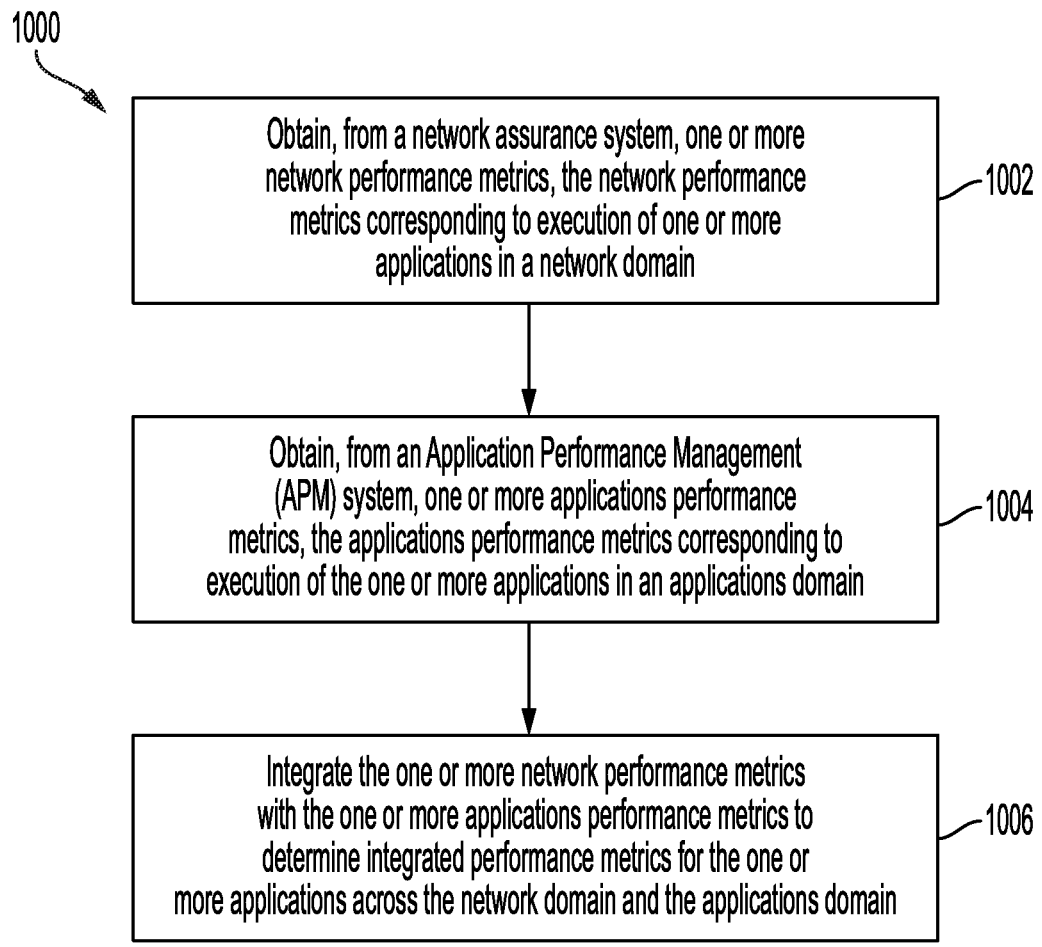
FIG. 10 illustrates a process integrating performance metrics of a network domain and an applications domains, in accordance with some examples.

Having described example systems and concepts, the disclosure now turns to the process 1000 illustrated in FIG. 10. The blocks outlined herein are examples and can be implemented in any combination thereof, including combinations that exclude, add, or modify certain steps.

At the block 1002, the process 1000 includes obtaining, from a network assurance system, one or more network performance metrics, the network performance metrics corresponding to execution of one or more applications in a network domain. For example, the network assurance system 302 can determine one or more of a latency, jitter, network delay, response time, application delay, packet loss or retransmissions of one or more packets of the one or more applications flowing through an enterprise network 300 in the network domain based, for example, on the one or more network performance metrics being measured by an Application Response Time (ART) tool such as the ART 506 for inspecting packets flowing between the client 502 and the server 504 in the network domain of the network 300.

At the block 1004, the process 1000 includes obtaining, from an Application Performance Management (APM) system, one or more applications performance metrics, the applications performance metrics corresponding to execution of the one or more applications in an applications domain. For example, the APM system 602 can utilize one or more of the agents 608 to obtain one or more of a latency, application delay, load, average response time, error rate, processor utilization, or memory utilization, for execution of the one or more applications in an applications domain of a monitored network such as the campus 308, branches 306, etc.

At the block 1006, the process 1000 includes integrating the one or more network performance metrics with the one or more applications performance metrics to determine integrated performance metrics for the one or more applications across the network domain and the applications domain. In some examples, integrating the one or more network performance metrics with the one or more applications performance metrics can be based on exchanging information between the network domain and the applications domain. For example, the network assurance system 302 can receive and exchange information from the APM system 602 as shown in FIG. 6. In another example, information exchanges 900 which can be performed between the network assurance system 908 and the APM controller 904 is shown in FIG. 9.

In some examples, integrating the one or more network performance metrics with the one or more applications performance metrics can include sharing known applications issues in the applications domain with the network domain and/or sharing known applications issues in the network domain with the applications domain. In some examples, the one or more network performance metrics can include a network health score, where the one or more applications performance metrics include an APM health score, and the integrated performance metrics include an integrated applications health score.

In some examples, as a result of integrating the one or more network performance metrics with the one or more applications performance metrics, triaging of an applications issue can be efficiently performed based on the integrated performance metrics, to determine whether the application issue was caused in one of the network domain, the applications domain, or both the network domain and the applications domain. In some examples, a root cause of the applications issue can be determined within one or both domains based on the triaging.

In some examples, integrating the one or more network performance metrics with the one or more applications performance metrics can further include integrating a network trace of network elements (e.g., the elements 802A-E of FIG. 8) in the network domain with an application trace of application elements (e.g., the elements 806A-C of FIG. 8) in the applications domain and to determine an end-to-end integrated trace (e.g., trace 800 of FIG. 8) of elements in the path of an application executing across the network domain and the applications domain.

Figure 11:
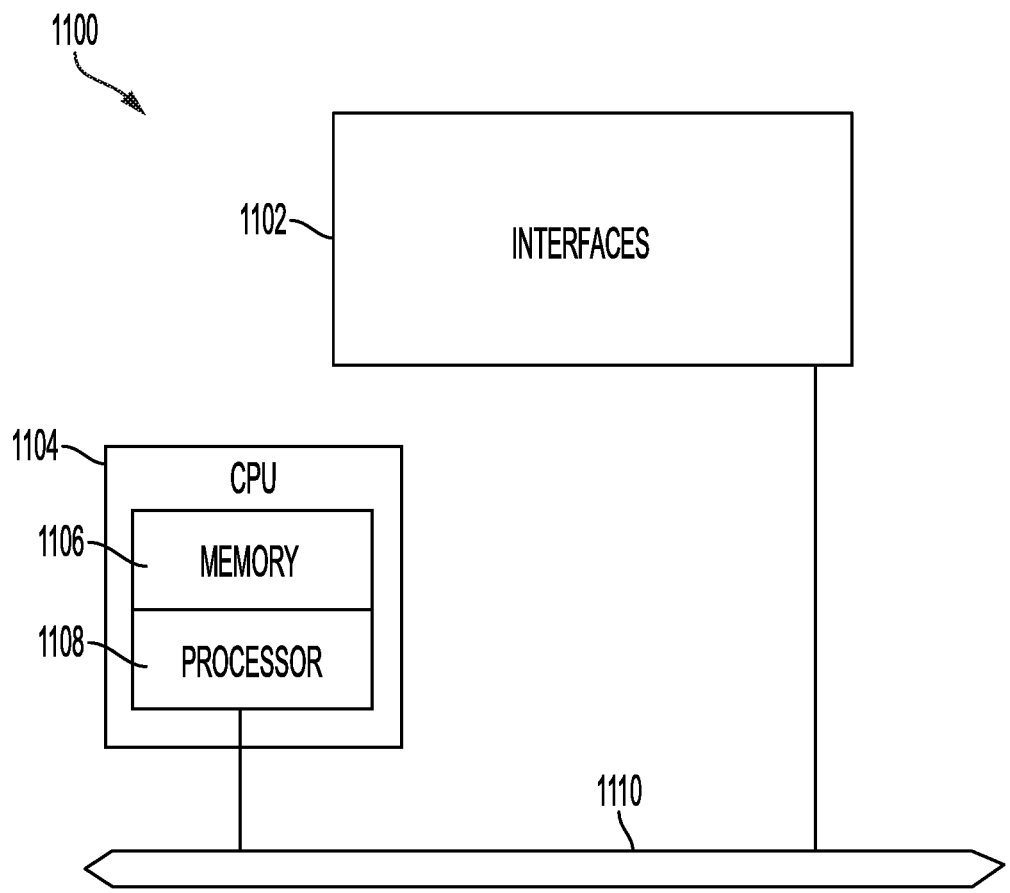
FIG. 11 illustrates an example network device in accordance with some examples.

FIG. 11 illustrates an example network device 1100 suitable for implementing the aspects according to this disclosure. In some examples, the network assurance system 302 may be implemented according to the configuration of the network device 1100. The network device 1100 includes a central processing unit (CPU) 1104, interfaces 1102, and a connection 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. The CPU 1104 may include one or more processors 1108, such as a processor from the INTEL X86 family of microprocessors. In some cases, processor 1108 can be specially designed hardware for controlling the operations of the network device 1100. In some cases, a memory 1106 (e.g., non-volatile RAM, ROM, etc.) also forms part of the CPU 604. However, there are many different ways in which memory could be coupled to the system.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 1104 to efficiently perform routing computations, network diagnostics, security functions, etc.

Although the system shown in FIG. 11 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 1106 could also hold various software containers and virtualized execution environments and data.

The network device 1100 can also include an application-specific integrated circuit (ASIC), which can be configured to perform routing and/or switching operations. The ASIC can communicate with other components in the network device 1100 via the connection 1110, to exchange data and signals and coordinate various types of operations by the network device 1100, such as routing, switching, and/or data storage operations, for example.

Figure 12:
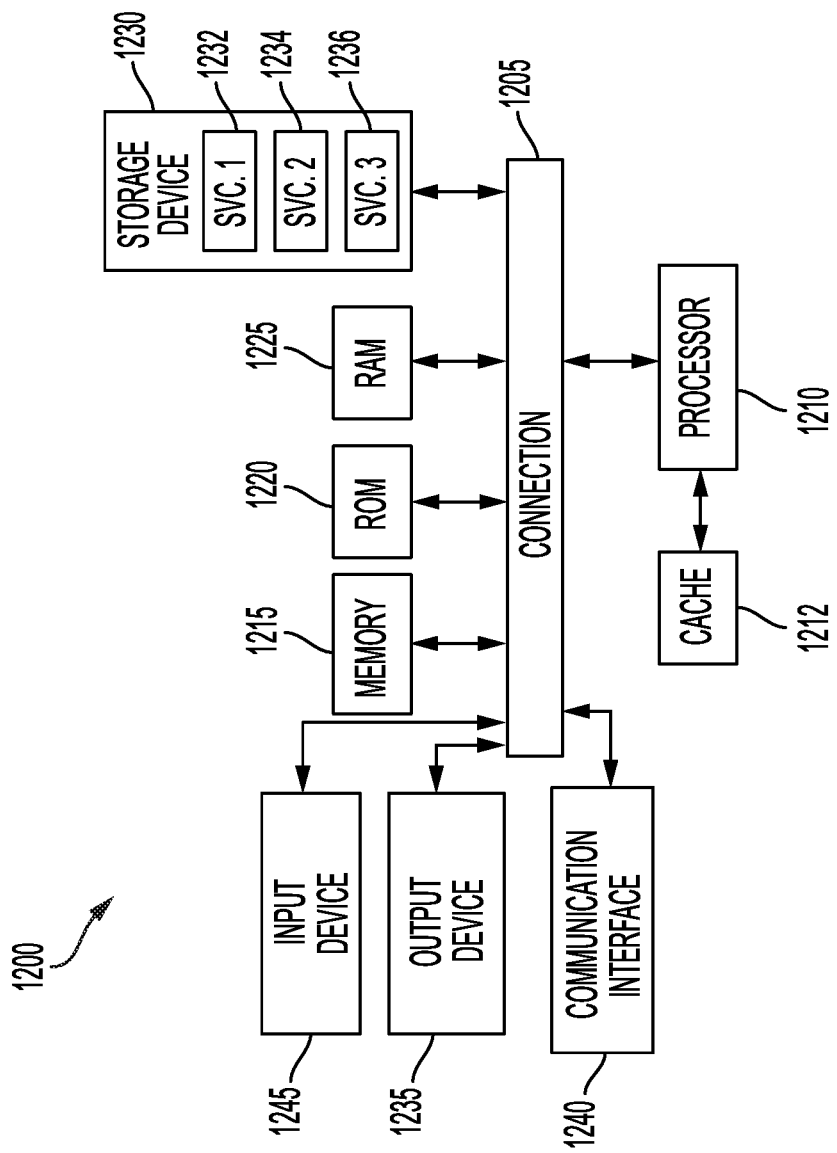
FIG. 12 illustrates an example computing device architecture, in accordance with some examples.

FIG. 12 illustrates an example computing device architecture 1200 of an example computing device which can implement the various techniques described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   obtaining, from a network assurance system, one or more network performance metrics, the network performance metrics corresponding to execution of one or more applications in a network domain;
   obtaining, from an Application Performance Management (APM) system, one or more applications performance metrics, the applications performance metrics corresponding to execution of the one or more applications in an applications domain;
   integrating the one or more network performance metrics with the one or more applications performance metrics to determine integrated performance metrics for the one or more applications across the network domain and the applications domain;
   integrating a network trace of network elements in the network domain with an application trace of application elements in the applications domain;
   determining an end-to-end integrated trace of elements based on the network trace and the application trace in a path of an application executing across the network domain and the applications domain; and
   determining whether an application issue was caused in one of the network domain, the applications domain, or both the network domain and the applications domain based on the integrated performance metrics and the end-to-end integrated trace of elements.

2. The method of claim 1, wherein the one or more network performance metrics comprise one or more of a latency, jitter, network delay, response time, application delay, packet loss or retransmissions of one or more packets of the one or more applications flowing through an enterprise network in the network domain.

3. The method of claim 2, wherein the one or more network performance metrics are measured by an Application Response Time (ART) tool for inspecting packets flowing between a client and a server in the network domain.

4. The method of claim 1, wherein the one or more applications performance metrics comprise one or more of a latency, application delay, load, average response time, error rate, processor utilization, or memory utilization, for execution of the one or more applications in the applications domain.

5. The method of claim 1, further comprising:
determining a root cause of the application issue based on the application issue caused in the one of the network domain.

6. The method of claim 1, further comprising one or more of:
sharing known applications issues in the applications domain with the network domain; or
sharing known applications issues in the network domain with the applications domain.

7. The method of claim 1, wherein the one or more network performance metrics comprise a network health score, the one or more applications performance metrics comprise an APM health score, and the integrated performance metrics comprise an integrated applications health score.

8. A system, comprising:
one or more processors; and
a non-transitory computer-readable storage medium containing instructions which, when executed on the one or more processors, cause the one or more processors to perform operations including:
obtaining, from a network assurance system, one or more network performance metrics, the network performance metrics corresponding to execution of one or more applications in a network domain;
obtaining, from an Application Performance Management (APM) system, one or more applications performance metrics, the applications performance metrics corresponding to execution of the one or more applications in an applications domain;
integrating the one or more network performance metrics with the one or more applications performance metrics to determine integrated performance metrics for the one or more applications across the network domain and the applications domain;
integrating a network trace of network elements in the network domain with an application trace of application elements in the applications domain;
determining an end-to-end integrated trace of elements based on the network trace and the application trace in a path of an application executing across the network domain and the applications domain; and
determining whether an application issue was caused in one of the network domain, the applications domain, or both the network domain and the applications domain based on the integrated performance metrics and the end-to-end integrated trace of elements.

9. The system of claim 8, wherein the one or more network performance metrics comprise one or more of a latency, jitter, network delay, response time, application delay, packet loss or retransmissions of one or more packets of the one or more applications flowing through an enterprise network in the network domain.

10. The system of claim 9, wherein the one or more network performance metrics are measured by an Application Response Time (ART) tool for inspecting packets flowing between a client and a server in the network domain.

11. The system of claim 8, wherein the one or more applications performance metrics comprise one or more of a latency, application delay, load, average response time, error rate, processor utilization, or memory utilization, for execution of the one or more applications in the applications domain.

12. The system of claim 8, wherein the operations further comprise:
determining a root cause of the application issue based on the application issue caused in the one of the network domain.

13. The system of claim 8, wherein the operations further comprise one or more of:
sharing known applications issues in the applications domain with the network domain; or
sharing known applications issues in the network domain with the applications domain.

14. The system of claim 8, wherein the one or more network performance metrics comprise a network health score, the one or more applications performance metrics comprise an APM health score, and the integrated performance metrics comprise an integrated applications health score.

15. A non-transitory machine-readable storage medium, including instructions configured to cause a data processing apparatus to perform operations including:
obtaining, from a network assurance system, one or more network performance metrics, the network performance metrics corresponding to execution of one or more applications in a network domain;
obtaining, from an Application Performance Management (APM) system, one or more applications performance metrics, the applications performance metrics corresponding to execution of the one or more applications in an applications domain;
integrating the one or more network performance metrics with the one or more applications performance metrics to determine integrated performance metrics for the one or more applications across the network domain and the applications domain;
integrating a network trace of network elements in the network domain with an application trace of application elements in the applications domain;
determining an end-to-end integrated trace of elements based on the network trace and the application trace in a path of an application executing across the network domain and the applications domain; and
determining whether an application issue was caused in one of the network domain, the applications domain, or both the network domain and the applications domain based on the integrated performance metrics and the end-to-end integrated trace of elements.

16. The non-transitory machine-readable storage medium of claim 15, wherein at least one of:
the one or more network performance metrics comprise one or more of a latency, jitter, network delay, response time, application delay, packet loss or retransmissions of one or more packets of the one or more applications flowing through an enterprise network in the network domain; or
the one or more applications performance metrics comprise one or more of a latency, application delay, load, average response time, error rate, processor utilization, or memory utilization, for execution of the one or more applications in the applications domain.

* * * * *